United States Patent [19]

Thornburg et al.

[11] 4,318,096
[45] Mar. 2, 1982

[54] GRAPHICS PEN FOR SOFT DISPLAYS

[75] Inventors: David D. Thornburg, Los Altos; Robert M. Flegal, Palo Alto; Tat C. Lam, Fremont, all of Calif.

[73] Assignee: Xerox Corporation, Stamford, Conn.

[21] Appl. No.: 150,773

[22] Filed: May 19, 1980

[51] Int. Cl.³ .............................................. G09G 1/00
[52] U.S. Cl. ........................................ 340/706; 178/18; 340/707; 340/710
[58] Field of Search .................................. 178/18-20; 340/707, 708, 706, 710, 709

[56] References Cited

U.S. PATENT DOCUMENTS

| | | | |
|---|---|---|---|
| 3,535,447 | 10/1970 | Wollrich | 178/18 |
| 3,846,826 | 11/1974 | Mueller | 340/710 |
| 3,932,862 | 1/1976 | Graven | 340/707 |
| 4,091,234 | 5/1978 | Bristow | 178/18 |
| 4,156,911 | 5/1979 | Crane et al. | 178/18 |

*Primary Examiner*—Marshall M. Curtis
*Attorney, Agent, or Firm*—Serge Abend

[57] ABSTRACT

A graphics input device for use with location indicating means to present graphic data upon a computer controlled visual display. The device includes a pen having a housing within which is disposed a conductive stylus shaft, one end extending beyond the housing to serve as the writing tip. A cylindrical off-axis pressure transducer encircles a portion of the stylus shaft within the housing, adjacent its writing end, for generating a variable output electrical signal proportional to the variable off-axis force applied to the stylus independently of the rotational orientation of the pen. A display processing and control system receives the variable signals and modifies a visual characteristic of the graphic data in response thereto.

9 Claims, 7 Drawing Figures

GRAPHICS PEN FOR SOFT DISPLAYS

This invention relates to a graphics input device for presenting graphic data upon a computer controlled visual display and for simply and easily modifying a visual characteristic of the graphic data.

Numerous systems are presently in use for the creation of user defined graphic data on computer systems which incorporate "soft"(e.g. CRT) displays. These incorporate devices which involve user interaction through a manipulable pointer which effects the motion of a cursor on the display screen. Examples of such devices in the form of manipulable housings movable over a planar surface are to be found in U.S. Pat. Nos. 3,541,541, issued to Douglas C. Engelbart on Nov. 17, 1970 and entitled "X-Y Position Indicator For A Display System", 3,835,464, issued to Ronald E. Rider on Sept. 10, 1974 and entitled "Position Indicator For A Display System", and 3,987,685, issued to Willard J. Opocensky on Oct. 26, 1976 and entitled "Cursor Position Device", the latter two patents being assigned to the same assignee as the instant invention.

Graphic systems more closely akin to the invention herein, i.e., in the form of a pen-like stylus used in an interactive system for the purpose of signature verification are shown in U.S. Pat. Nos. 3,528,295, issued to Johnson et al on Sept. 15, 1970 and entitled "Stylus With Pressure Responsive Transducer", and 3,618,019, issued to Niemerovsky et al on Nov. 2, 1976 and entitled "Signature Identification By Means Of Pressure Patterns". A pressure transducer in each of the described pens generates variable output signals indicative of idiosyncratic pressure patterns, which signals are then compared for similarity with previously recorded signal combinations representing known signatures. The specific type of pressure transducer used in 3,618,019 is not shown. In 3,528,294, conventional strain gauges are attached to flexible wall members within the pen. Off-axis forces are monitored with a set of four strain gauges responsive to distortions of the pen housing and axial forces are monitored by a single strain gauge mounted upon a transverse wall within the housing. Since the amplitude of the output signal from the off-axis transducers is sensitive to and dependent upon the relative rotational position of the pen, proper use requires a preferred position of usage. Departure from the preferred position will yield erroneous signals.

Experimentation with graphic arts has emerged with the advent of greater soft display utilization in other than purely informational modes. In use in the artistic mode, it is highly desirable to provide the artist, experimenting in this medium, with tools similar to those with which he is familiar, such as brushes or pens with flexible or interchangeable nibs. Also as the artist may experiment with color graphics on the CRT it is desirable to provide him with a palette of colors and some means to enable easy modification of luminosity or color intensity.

It is the object of the present invention to provide to the graphic artist, who is interacting with a computer controlled visual display, a versatile tool for creating freehand renderings. More particularly, an inexpensive, highly reliable input device is provided which will enable easy modification of the visual characteristics of the graphic data presented upon the display screen. Specifically, line width and line intensity may be varied in much the same way as is accomplished by means of a brush, pen or pencil, i.e., by the application of pressure to the tool. It is believed that after a short period of experimentation the artist will have mastered the techniques involved and will be able to create tonalities and textures in a manner similar to that used with his conventional tools. Then he may be able to implement new effects limited only by his imagination and creativity.

The graphics input device of this invention is used in cooperation with a known location indicating tablet which identifies the X-Y coordinates of the pen point. Examples of the types of tablet which may be used can be found in U.S. Pat. Nos. 3,959,585, issued to Mattes et al on May 25, 1976 and entitled "Graphical Input Terminal", and 4,129,747, issued to William Pepper Jr. on Dec. 12, 1978 and entitled "Human-Machine Interface Apparatus". The device includes a pen which comprises a housing sleeve with an internal conductive stylus shaft extending outwardly from the writing end of the housing. Within the housing, adjacent the writing end, is a cylindrical, off-axis pressure transducer, encircling a portion of the conductive shaft for generating a variable output electrical signal proportional to the variable off-axis force applied to the stylus, independently of the rotational position at which the pen is held. In addition, a display processor is provided to modify a visual characteristic of the graphic data, for example, to vary the line width or intensity, in response to the variable output signal.

A more complete understanding of the invention and its advantages may best be understood by reference to the following description taken in conjunction with the accompanying drawings.

Referring to the drawings.

Figure 1:
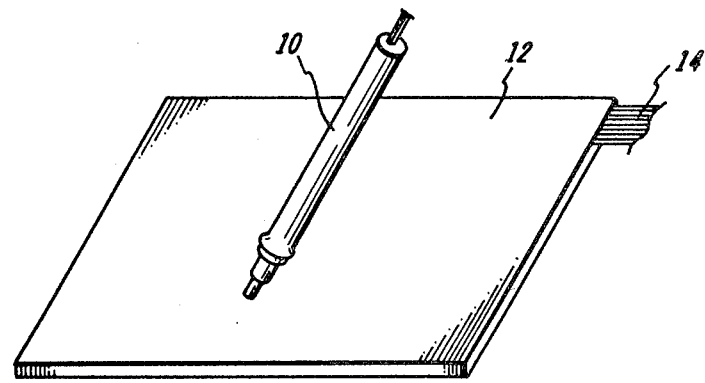
FIG. 1 is a perspective view of the graphics input pen of this invention in use with a coordinate tablet for inputting a visual display.

Turning now to FIG. 1, there is illustrated the graphics input pen 10 in use upon an X-Y coordinate tablet 12 from which a transfer bus 14 extends. The tablet per se does not form part of this invention and any one of a number of known constructions may be used. Two representative examples of tablets capable of providing X-Y coordinate information to a data processing display system are set forth above, namely U.S. Pat. No. 3,959,585 and U.S. Pat. No. 4,129,747. The pen may be used to input graphic data to the display system in a known manner by writing or drawing upon the tablet. However, as will be described, the novel pen of this invention may be used in a system to modify a visual characteristic of the displayed graphic data, such as varying line width and/or line intensity simultaneously with the generation of a line. In this way it is much more akin to conventional marking instruments, such as the artists brush or set of pens with interchangeable nibs, than it is to the known electronic data writing stylus.

Figure 2:
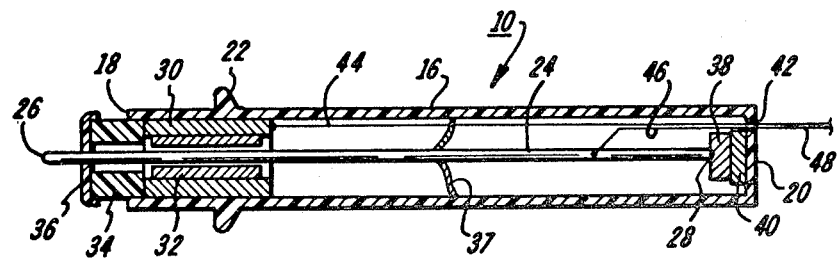
FIG. 2 is sectional view taken through the pen.
Figure 3:
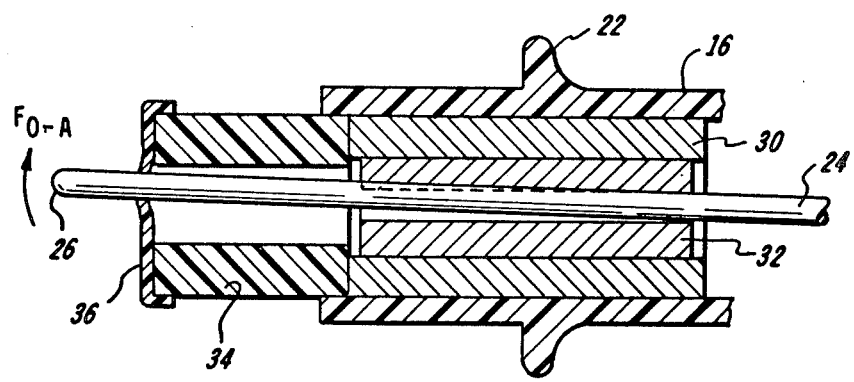
FIG. 3 is an enlarged sectional view taken through the anterior end of the pen showing the unique pressure transducer being deformed by an off-axis force.
Figure 4:
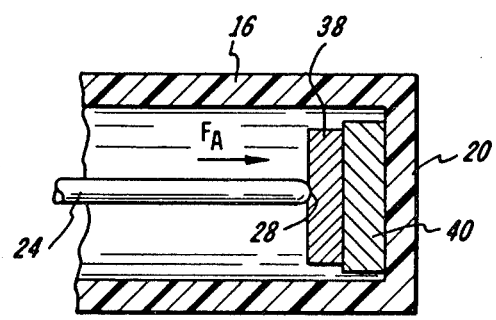
FIG. 4 is an enlarged sectional view taken through the posterior end of the pen showing deformation of the axial pressure transducer by an axial force.

A more complete understanding of the graphics input pen 10 will be possible upon reviewing FIGS. 2-4 wherein the pen is shown in its static state as well as in two modes of use for producing analog signals indicative of stylus pressure and angles.

The pen comprises an electrically insulating housing 16 having an open anterior or writing end 18 and a closed posterior end 20. For comfort in using the device, a circumferential seat 22 may be integrally molded on the exterior of the housing. Disposed within the housing is a conductive stylus shaft 24 rounded at both ends 26 and 28, with the writing end 26 extending outwardly from the pen. A metal cylinder 30, serving as the off-axis electrode, lines the anterior end of the housing and is itself lined with a pressure transducer cylinder 32 of a conductive elastomer, such as PITEL-PR rubber made by Dupont, through which the stylus shaft 24 passes. In its static state, there should be a slight circumferential clearance between the shaft and the central opening of cylinder 32. An annular extension 34, made of electrically insulating material, may be press fit into the housing open end 18 to support a flexible insulating protective cap 36 which serves to prevent contaminants from entering the housing. The cap 36 also serves to centrally support the stylus shaft 24 out of contact with the pressure transducer 32 when the pen is not in use, in cooperation with flexible spider spring 37 which performs the dual function of centering the shaft and preventing it from falling out of the housing while allowing it to be moved axially and off-axis in response to the forces applied to it.

Rounded end 28 of the stylus shaft is held adjacent axial pressure transducer pad 38, made of a conductive elastomer similar to that used for cylinder 32, by the spring force of spider 37. Elastomeric transducer pad 38 is mounted upon conductive axial pressure electrode 40, which, in turn is secured to the posterior end 20 of housing 16. An opening 42 in the posterior end 20 passes wires 44, 46 and 48, each connected respectively to off-axis electrode 30, stylus shaft 24 and axial electrode 40.

In use the pen is manipulated in much the same manner as a conventional ball point pen, pencil or brush, in that it functions equally well in any relative rotational position. When an off-axis force ($F_{o-A}$) is applied, as shown in FIG. 3, the stylus shaft 24 pivots about its rounded end 28 and a portion of the shaft is urged into interference with elastomeric pressure transducer cylinder 32 which is deformed thereby in proportion to the magnitude of the off-axis force. Flexible end cap 36 will, of course, deform to compensate for shaft movement. Similarly, the application of an axial force ($F_A$) along the stylus shaft 24 will cause rounded end 28 to deform elastomeric pressure transducer pad 38 (see FIG. 4). In each case, the applied force (F) increases the contact area between the conductive shaft and the elastomeric transducer.

Figure 5:
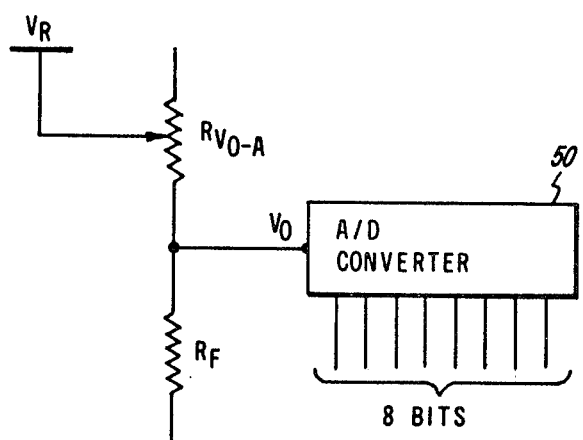
FIG. 5 is an electrical circuit representation of the pen.

An electrical circuit representation of the off-axis elastomeric transducer is illustrated in FIG. 5. A reference voltage ($V_R$) is connected to the conductive shaft 24 by lead 46. Elastomeric pressure transducer cylinder 32, represented by the off-axis variable resistance ($R_{V_{o-A}}$), is connected by lead 44 in a voltage divider circuit having a fixed resistance $R_F$ and an output voltage $V_o$. When the stylus shaft is out of contact with the off-axis transducer 32, variable resistor $R_{v_o-A}$ is infinite.

Initial, small area contact caused by a small off-axis force $F_{o-A}$ (see FIG. 3) will result in a high resistance across the variable resistor. As the area of contact increases in response to the application of a greater off-axis force ($F_{o-A}$) the variable resistance will decrease. The output voltage signal $V_o$ which varies in direct proportion to variations in transducer resistance is introduced to an analog-to-digital converter 50 having an 8-bit output. Thus, in response to the variable input signal, A/D converter 50 enables a range of values from 0 to 256 to be attributed to the input voltage values. Transition points may then be assigned in the system software for changing the visual characterics of the graphic data. For example, a A/D converter output in the range of "0-50" would dictate a fine line, and "over 250" would dictate a wide line. Appropriately set transition points therebetween would dictate intermediate line widths. Of course, the digital output could also be used to cause variations in black and white intensity to create a grey scale, or if color is being used on a display the output could vary color intensity.

The elastomeric axial transducer 38 may be connected in a similar circuit. Alternatively, both the axial and off-axis elastomeric transducers may be connected in a single circuit to create a single variable output voltage representative of the variable resultant force, independent of the pen angle.

Figure 6:
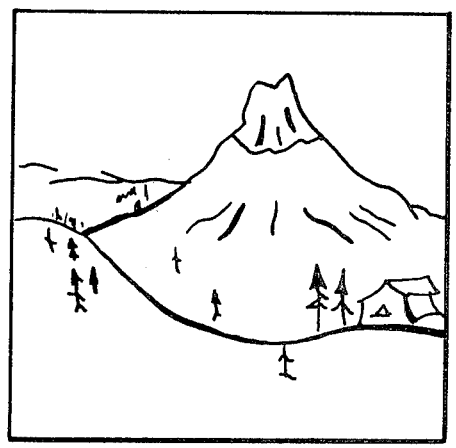
FIG. 6 is a drawing, made with the device of this invention, showing variable width lines produced with single strokes.

A picture, as shown in FIG. 6, was drawn by means of a pen 10 and displayed on a CRT. Variable width lines were achieved solely by the application of variable pressure to the graphic input pen.

Figure 7:
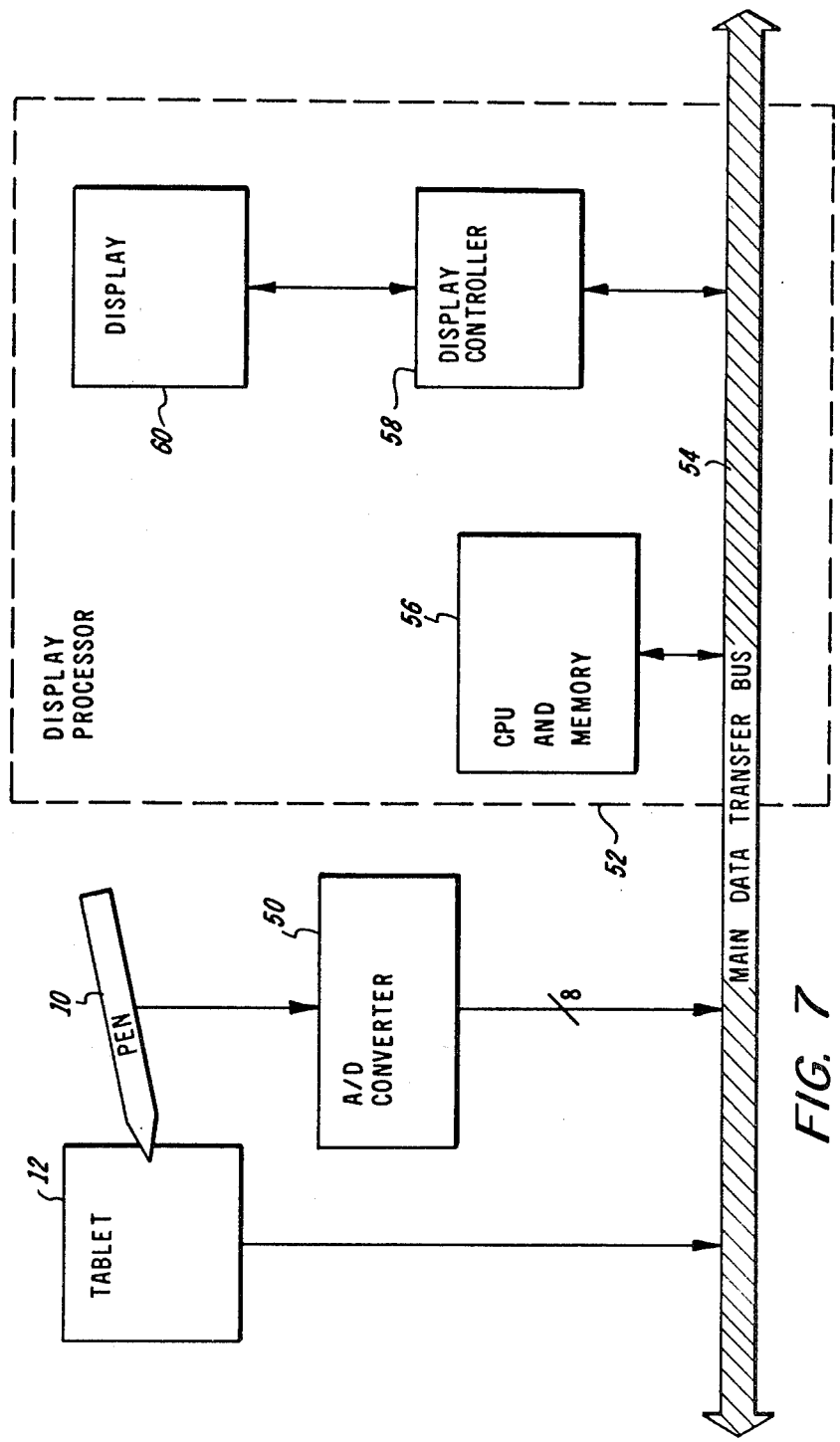
FIG. 7 is a block diagram representation of the graphics input device including a pen in use with an exemplary data processing display system.

For a better understanding of a system which will enable the novel graphics input pen of this invention to yield modified visual characteristics of displayed line information, reference is made to FIG. 7, in which there is illustrated the improved graphics input pen 10 with its associated X-Y coordinate tablet 12 and their relationship to a general purpose display processor 52. The processor (shown enclosed in dashed lines) and its related 16 bit main data transfer bus 54 may be of the type more specifically described in U.S. Pat. No. 4,103,331 entitled "Data Processing Display System" issued to Charles P. Thacker on July 25, 1978 and assigned to the same assignee as the instant application. This system is exemplary only, as any suitable display processor may be provided to perform the desired functions.

Digital coordinate information is provided to the CPU and memory 56 and subsequently the display controller 58 and display 60 in accordance with the location of the pen 10 upon the tablet 12. Digital information for modifying a visual characteristic of the thus identified linear graphic data is also provided to the CPU and memory 56 through the main data transfer bus 54 in the form of the 8-bit output signal of A/D converter 50. As set forth above, this 8-bit signal enables the identification of 256 states of pen pressure. By appropriately programming the CPU and memory in accordance with the programming language disclosed in the Thacker '331 patent, or as necessitated by an alternative system, suitable transition points may be selected for instructing the display controller 58 to vary the line width or line intensity on the display 60.

It should be understood that the present disclosure has been made only by way of example, and that numerous changes in details of construction and the combination and arrangement of parts may be resorted to without departing from the scope and the spirit of the invention as hereinafter claimed.

What is claimed is:

1. A graphics input device for use with location indicating means to present graphic data upon a computer controlled visual display characterized by including,
 a pen housing,
 a conductive stylus shaft secured within said housing having one end extending beyond said housing to act as a writing tip for generating a position signal,
 circumferential off-axis pressure responsive electrode means surrounding a portion of said stylus shaft for generating a variable output non-position signal in response to variable off-axis forces at any circumferential location on said stylus shaft, and
 means responsive to said variable output signal for modifying a visual characteristic of the graphic data.

2. The graphics input device as defined in claim 1 characterized in that said responsive means varies the line width of said graphic data.

3. The graphics input device as defined in claim 1 characterized in that said responsive means varies the luminosity of said graphic data.

4. The graphics input device as defined in claim 1 characterized in that said electrode means comprises a sleeve of conductive elastomeric material.

5. The graphics input device as defined in claim 4 characterized in that said sleeve is cylindrical and is positioned within said housing adjacent to said one end of said stylus shaft.

6. The graphics input device as defined in claim 1 characterized by further including axial pressure responsive electrode means positioned within said housing at the other end of said stylus shaft for generating a second variable output non-position signal in response to an axial force on said stylus shaft.

7. The graphics input device as defined in claim 6 characterized in that said responsive means modifies a first visual characteristic of the graphic data in response to said variable output signal and modifies a second visual characteristic of the graphic data in response to said second variable output signal.

8. The graphics input device as defined in claim 6 characterized in that said responsive means modifies a visual characteristic of the graphic data in response to a combination of said variable output signal and said second variable output signal.

9. The graphics input device as defined in claim 6 characterized in that said axial pressure responsive electrode means comprises a pad of conductive elastomeric material.

* * * * *